(12) United States Patent
Weber et al.

(10) Patent No.: US 11,545,877 B2
(45) Date of Patent: Jan. 3, 2023

(54) DISCHARGE DEVICE FOR DISCHARGING ELECTRIC CURRENTS

(71) Applicant: SCHUNK CARBON TECHNOLOGY GMBH, Bad Goisern (AT)

(72) Inventors: Markus Weber, Bad Goisern (AT); Ludwig Kain, Bad Goisern (AT); Marcus Hemetsberger, Bad Ischl (AT)

(73) Assignee: SCHUNK CARBON TECHNOLOGY GMBH, Bad Goisern (AT)

( * ) Notice: Subject to any disclaimer, the term of this patent is extended or adjusted under 35 U.S.C. 154(b) by 185 days.

(21) Appl. No.: 16/980,887

(22) PCT Filed: Mar. 21, 2019

(86) PCT No.: PCT/EP2019/057124
§ 371 (c)(1),
(2) Date: Sep. 15, 2020

(87) PCT Pub. No.: WO2019/185447
PCT Pub. Date: Oct. 3, 2019

(65) Prior Publication Data
US 2021/0044178 A1   Feb. 11, 2021

(30) Foreign Application Priority Data

Mar. 28, 2018 (DE) .................. 10 2018 107 408.5

(51) Int. Cl.
*H02K 11/00* (2016.01)
*H02K 1/12* (2006.01)
(Continued)

(52) U.S. Cl.
CPC .............. *H02K 11/00* (2013.01); *H02K 1/12* (2013.01); *H02K 1/22* (2013.01); *H02K 7/003* (2013.01); *H02K 7/08* (2013.01)

(58) Field of Classification Search
CPC . H02K 11/00; H02K 1/12; H02K 1/22; H02K 7/003; H02K 7/08; H02K 11/40;
(Continued)

(56) References Cited

U.S. PATENT DOCUMENTS

| 8,488,293 B2* | 7/2013 | Baumann ................ F16C 19/06 |
| | | 361/220 |
| 2007/0257569 A1* | 11/2007 | Heyder ................... F16F 1/326 |
| | | 310/66 |

(Continued)

FOREIGN PATENT DOCUMENTS

| DE | 1091605 B | 10/1960 |
| DE | 20106984 U1 | 9/2001 |

(Continued)

*Primary Examiner* — Tulsidas C Patel
*Assistant Examiner* — Viswanathan Subramanian
(74) *Attorney, Agent, or Firm* — Dickinson Wright PLLC; Andrew D. Dorisio

(57) ABSTRACT

A discharge device for discharging electric currents in a machine from a rotor part to a stator part, the rotor part in particular having a shaft, the discharge device comprising a contact element and a spring being connectable to the stator part in an electrically conductive manner, the contact element made predominantly of carbon, the contact element pressurized with a contact force by the spring for realizing an electrically conductive sliding contact between a sliding contact surface of the contact element and an axial shaft contact surface of the shaft. The contact element is circular, the sliding contact surface being at least annular in shape and disposed coaxially in relation to the shaft contact surface, the spring includes a circular support section which at least in part coaxially envelops the shaft of the machine, the support section being configured for radially abutting against an abutment surface of the stator part.

19 Claims, 1 Drawing Sheet

(51) Int. Cl.
*H02K 1/22* (2006.01)
*H02K 7/00* (2006.01)
*H02K 7/08* (2006.01)

(58) Field of Classification Search
CPC ...... H01R 39/085; H01R 39/10; H01R 39/12; H01R 39/64
USPC .......................................................... 310/232
See application file for complete search history.

(56) References Cited

U.S. PATENT DOCUMENTS

| | | |
|---|---|---|
| 2013/0033139 A1 | 2/2013 | Tones et al. |
| 2016/0372987 A1 | 12/2016 | Tejano et al. |
| 2017/0149313 A1* | 5/2017 | Schulze .................. H02K 3/28 |
| 2017/0353087 A1 | 12/2017 | Magno Dos Santos et al. |

FOREIGN PATENT DOCUMENTS

| | | |
|---|---|---|
| DE | 102004041074 A1 | 3/2006 |
| DE | 102010039847 A1 | 3/2012 |
| DE | 102013223673 A1 | 6/2015 |
| WO | 2015044034 A2 | 4/2015 |

* cited by examiner

DISCHARGE DEVICE FOR DISCHARGING ELECTRIC CURRENTS

FIELD OF THE INVENTION

Background of the Invention

The invention relates to a discharge device for discharging electric currents from a rotor part of a machine to a stator part of the machine, the rotor part in particular having a shaft, the discharge device comprising a contact element and a spring means, the spring means being connectable to the stator part in an electrically conductive manner, the contact element being made predominantly of carbon, the contact element being pressurized with a contact force by means of the spring means for realizing an electrically conductive sliding contact between a sliding contact surface of the contact element provided for realizing the sliding contact and an axial shaft contact surface of the shaft.

SUMMARY OF THE INVENTION

Discharge devices of the kind mentioned above are known from the state of the art in different embodiments. Using carbon brushes for discharging low-frequency direct currents has been a particularly well-known method, the carbon brushes being radially dispersed around a shaft on a sliding ring and being contacted with a stator via pigtails. The carbon brushes received in a holding means or a brush holder allow directly discharging electric currents owing to their low electric resistance and thus can prevent an undesired current feed via installation points of the shaft, which could lead to surface damage of the bearing bodies or bearing rings due to welding or spark erosion at specific points.

The term shaft is used as a synonym for the term rotor part or axis. The term shaft therefore pertains to all rotating machine parts via which currents can be discharged to a stationary stator part or a machine part of a machine.

Discharge devices are typically employed in rail engineering, in which instance alternating currents or an operating current can discharge via wheel axes. DE 10 2010 039 847 A1 discloses a discharge device on which an electrically conductive end cap is installed on an axial end of a shaft or a wheel axis of a set of wheels, the electrically conductive end cap being able to be contacted with a plurality of carbon brushes held by brush holders and disposed in the axial direction in relation to the shaft. Die carbon brushes are each directly connected to a ground via a pigtail, and a contact force is applied to each sliding contact surface of the carbon brushes via a spring.

Similar measures for discharging currents are also required for electric machines in general, such as motor vehicles. With motor drive shafts or gear shafts connected thereto or other functional components, continuously fluctuating alternating voltages or currents and high-frequency electric currents can occur which can also damage bearing positions of a rotor shaft or a gear shaft, for which reason discharge devices are typically required here. A disadvantage of known discharge devices is, however, that these require a comparatively large amount of installation space due to their setup. Solutions employing mesh fiber or mesh wire instead of carbon brushes are known; however, mesh fiber or mesh wire have a large transition resistance due to a particularly small contact surface of a sliding contact and thus only small currents can be discharged. For forming a large contact surface to the shaft, however, a large number of carbon brushes is required which would each require a brush holder requiring large installation space and corresponding installation effort due to their position.

WO 2015/044034 A2 discloses a contact unit which is made up of a contact piece and a spring, the spring annularly encircling a rotor shaft of a rotor of an electric machine and thus forming a support section which abuts against a casing of the electric machine. A spring section extends from the support section, a contact piece being fastened to the end of the spring section in a bonded manner. The contact piece abuts against a front surface or a rotating bearing ring of the rotor so that an induced electric current can be discharged from the rotor to the casing via the contact piece and the spring.

The object of the invention at hand is therefore to propose a discharge device which has a low transition resistance and is easy to install while taking up little installation space.

The discharge device according to the invention for discharging electric currents from a rotor part of a machine to a stator part of the machine, the rotor part in particular having a shaft, comprises a contact element and a spring means, the spring means being connectable to the stator part in an electrically conductive manner, the contact element being made predominantly of carbon, the contact element being pressurized with a contact force by means of the spring means for realizing an electrically conductive sliding contact between a sliding contact surface of the contact element provided for realizing the sliding contact and an axial shaft contact surface of the shaft, the contact element being circular, the sliding contact surface being at least annular in shape and being disposed coaxially in relation to the shaft contact surface, the spring means comprising a circular support section which coaxially encircles the shaft of the machine at least partially, the support section being configured for radially abutting against an abutment surface of the stator part.

Therefore, the discharge device is realized for being installed on a rotating shaft or an axis of a machine. For this purpose, it is intended to radially dispose the discharge device on a section of the shaft in such a manner that the shaft is radially encircled by the discharge device. The axial shaft contact surface is disposed in the corresponding section of the shaft. By means of the spring means, the contact element can be pressurized with the contact force acting axially in the direction of a rotational axis of the shaft so that the contact element is pressed against the shaft contact surface by its sliding contact surface. With respect to a common sliding piece, a significantly larger sliding contact surface can be realized since the contact element is circular, resulting in a particularly safe connection between the shaft and the stator part of the machine with good electric conductivity. The contact element can also be comparatively short or thin with regard to its axial length. Accordingly, the contact element has an annular sliding contact surface, which can be disposed coaxially in relation to the shaft contact surface. As an abrasive wear of the sliding contact is reduced with respect to the large sliding contact surface, the contact element can also be shaped like a disc or be thin, without becoming worn any faster than a contact element known from the state of the art having a small sliding contact surface and large length. With respect to a common sliding piece, installation space can be kept to a minimum since the contact element is comparatively short or thin with respect to its axial length. It is also no longer required to install a plurality of contact elements for attaining a low transition resistance at the shaft since only one individual annular contact element can form a sufficiently large sliding contact surface. Furthermore, the axial position of the contact element or the spring means in relation to the rotor yields a particularly simple installation of the discharge device in comparison to a radial position. Thus, the discharge device is made up of essentially only the contact element and the spring means and can be simply inserted or clamped between a casing of the machine and the shaft.

It is also advantageous that the support section is circular and configured for radially abutting against an abutment surface of the stator part or a casing. The outer measurements of the spring means can be round so that it can be installed particularly easily in a casing of the machine. Such a spring means can be positioned or centered simply by an outer diameter of the support section abutting against a diameter of the casing or also a casing lid, without a particular fixation of the spring means to the casing being necessary. Nevertheless, the spring means can also be connected to the support section in a form-fit or bonded manner and to the casing in an electrically conductive manner.

The shaft contact surface can be realized by a shaft ledge of the shaft or a ring of the discharge device disposed on the shaft. A front surface of the shaft ledge can form the axial shaft contact surface of the shaft. As an alternative, a ring in the make of a sliding ring can be envisaged which is fastened on the shaft, an axial side surface of the ring then being able to form the shaft contact surface of the shaft. The ring can be a component of the discharge device in this case. It is also tenable for the shaft contact surface to be formed by a bearing ring of a bearing, for instance a rolling bearing.

The contact element can consist predominantly of graphite and be made in one piece. For instance, the contact element can be a carbon mold which is made by punching and burning or sintering. The contact element can be made of graphite, black carbon, carbon fibers or a mixture of these materials and contain metal particles of iron, nickel, copper, zinc, silver, aluminum and/or chrome as well as a binding agent or a binder phase. An outer diameter or a maximum outer measurement of the circular contact element can be several times thicker than the contact element. The ratio of the outer measurement of the contact element to the thickness can be 2:1, 3:1, 4:1, 5:1 or 10:1.

The spring means can comprise a holding section, which forms a holding means for holding the contact element, the spring means being able to comprise a spring section which extends from the holding section to the support section and enables the contact element to move in relation to the support section. The holding means can be molded on the spring section. The holding section can be further molded to the spring section on an inner side thereof. The contact element can be fastened to the holding means in nearly any manner. The spring section can be at least partially circular, preferably entirely circular, and be molded to the support section and be formed within the support section. If the spring section is formed within the support section, the contact element can be positioned closely to a shaft, whereby the contact element becoming worn less in comparison to a contact element disposed further away from the shaft.

The spring section can protrude beyond a support plane of the support section and space the holding means from the support section. The support plane can extend orthogonally to a rotational axis of the shaft in this context. A distance of the support plane in relation to the holding section or the holding means then essentially corresponds to a possible spring trajectory of the spring section of the spring means. It is generally also conceivable for the spring section to essentially lie in the support plane and to not be moved out of the support plane until a spring force has been applied. In all instances, however, it is mandatory for the contact piece fastened to the spring means to protrude so far beyond the support plane of the support section that a contact force can be applied to the contact element and consequently to the shaft and the shaft contact surface via at least the spring section.

The spring section can be made of at least one spring arm, preferably of two spring arms, particularly preferably of three or more spring arms. Just one spring arm already enables producing a contact force which is applied to the shaft contact surface. Two or even three spring arms allow distributing a contact force particularly evenly on the shaft contact surface, whereby the contact element becomes worn mostly evenly.

The spring arm can extend from the holding section to the support section in a helical or spiraled shape. The spring arm can then be realized as a kind of coil spring or helical spring. In relation to a radial length of the spring means, the spring arm can be disposed between the holding section and the support section. Generally, it can also be intended to dispose the spring arm between the holding section and the support section in relation to an axial length of the spring device.

A length of the spring arm can be ½ of a winding, ⅓ of a winding, ¼ of a winding or 1/spring-arm number of a winding. Consequently, the spring arm does not have to be as long as one complete winding. It is particularly advantageous if the length or the winding corresponds to a reciprocal number of the spring arms of the spring means.

The contact element can also be fastened to the holding means in a form-fit and/or bonded manner. Since the contact element can be particularly delicate, such a fastening ensures that the contact element is not inadvertently destroyed when installing the discharge device.

The holding means can form a circular holding sheet, to which the contact element can be fastened by means of riveting, welding, soldering, flanging or adhesion. Following this, the holding sheet can be connected to the contact element in a form-fit and/or bonded manner as well as in an electrically conductive manner. By forming the holding sheet in a circular shape, it becomes possible to fasten the contact element directly to the spring means. For instance, a surface of the circular holding sheet can serve as an abutment surface for the contact element. The contact element can then be simply connected to the holding sheet in an electrically conductive manner. The discharge device can thus be realized particularly inexpensively.

Alternatively, the holding means can comprise a circular contact sheet to which the contact element can be fastened by means of riveting, welding, soldering, flanging or adhesion, the contact sheet being able to be fastened to the holding sheet by means of riveting, welding, soldering, flanging or adhesion. The contact sheet can therefore be connected to the holding sheet in a form-fit and/or bonded manner, the holding sheet itself being able to be connected to contact sheet in a form-fit and/or bonded manner. By using the contact sheet, mechanically stabilizing the contact element becomes possible such that the contact element is not bent and possibly broken. The contact element can be particularly thin. Furthermore, it is also possible to use a comparatively thin material, such as a metal sheet, for the holding section and/or the spring means. The circular contact sheet consequently allows even distribution of a contact force produced via the spring section.

The support section can be made of a radial circular washer and an axial circular collar joined thereto for abutment against the abutment surface. The circular washer extends in a radial direction in relation to the shaft and is formed such by means of flanging, punching or deep-drawing an outer edge that the circular collar disposed axially in relation to the shaft is formed. A diameter of the circular collar corresponds essentially to an inner diameter of the cylindric abutment surface of the stator part or the casing of the machine, in which the shaft is installed. A press fit can be realized between the axial circular collar and the abutment surface, for example, so that the discharge device can be installed in a machine by means of the support section using simple means.

Thus, it is particularly advantageous if the circular collar is conic in shape. In particular, a cone of the circular collar can become larger at an outer diameter towards a free of the circular collar. The discharge device can be inserted or centered particularly well in a cylindric recess. When inserting the discharge device, the conic circular collar can be at least partially formed in this context.

In the circular collar, slits can be formed which form spring claws for abutting against the abutment surface. The formed slits enable forming the circular collar without much force. It can be intended in particular that a plurality of axial slits are dispersed evenly around a circumference of the circular collar. If the circular collar is then also conic in shape, the circular collar can be easily elastically deformed like a spring. The slits consequently form spring claws which cause a spring force on the abutment surface acting in the radial direction. Inserting the discharge device in a cylindric recess as well as removing it therefrom is thus significantly facilitated.

The spring means can consist of an electrically conductive metal, preferably phosphorous bronze, brass or steel. The spring means can serve as a conductor for electric currents to be discharged via the contact element. In particular if the circular support section of the spring means is directly contacted with the abutment surface of the stator part, it is no longer necessary to provide an additional conductor, for example in the form a pigtail or similar.

Furthermore, the spring means can be made in one piece, preferably of a metal sheet by means of punching or bending. The spring means can consequently be made in the form of a leaf spring which can be punched from the metal sheet in one work step.

The spring means can have a coating made of copper, nickel, tin, zinc, gold or silver. Such a coating can further improve an electric conductivity or a corrosion protection of the spring means. The machine according to the invention comprises a rotor part made from a shaft, a stator part and a discharge device according to the invention.

The abutment surface can be an inner surface of a casing of the machine. In particular, the abutment surface can coaxially encircle the shaft of the machine.

A rolling bearing of the shaft can abut against the inner surface. The discharge device can be realized such that it has an outer diameter which essentially corresponds to an outer diameter of the rolling bearing. This enables a particularly simple installation of the discharge device next to the rolling bearing. Discharging electric currents via the rolling bearing can thus be reliably prevented. The installation space for the discharge device in the casing of the machine can also be kept as little as possible. Moreover, it becomes possible to also replace the discharge device when replacing the rolling bearing.

BRIEF DESCRIPTION OF THE DRAWING FIGURES

In the following, the invention is further described with reference to the attached drawings.

DETAILED DESCRIPTION OF THE INVENTION

Figure 1:
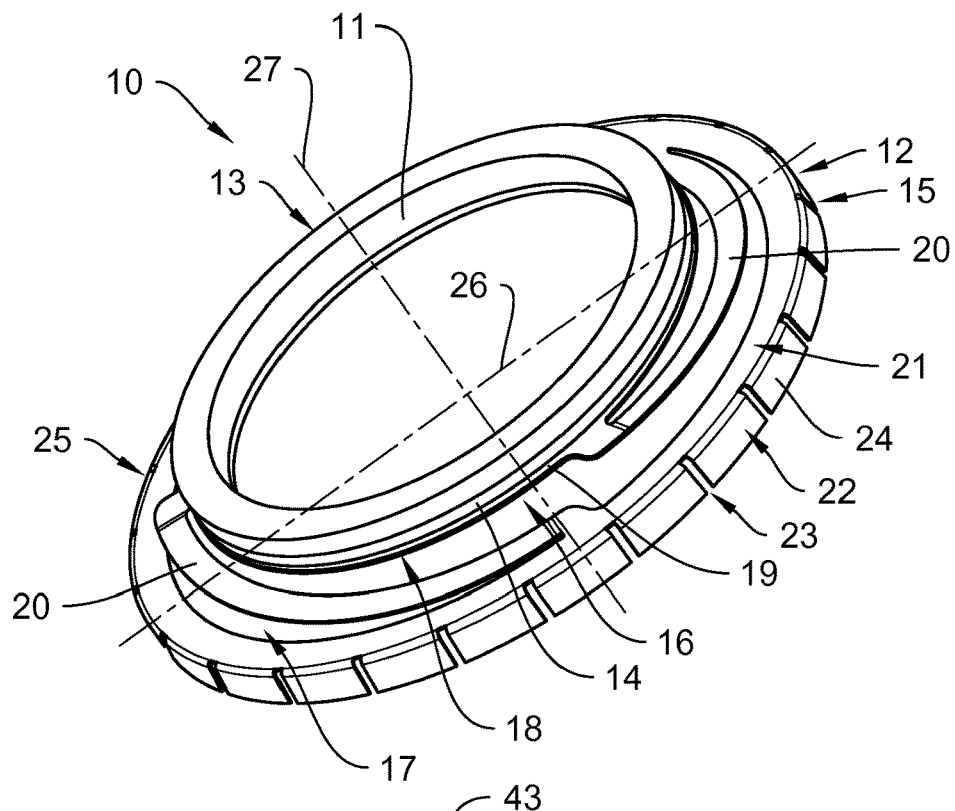
FIG. 1 is a perspective view of a discharge device.

FIG. 1 is a perspective view of a discharge device 10 for discharging electric currents from a rotor part of a machine (having a not-illustrated shaft) to a stator part of the machine. Discharge device 10 comprises a contact element 11 which is made of carbon, in particular graphite, and a spring means 12 which is made of a metal sheet via punching or bending. Contact element 11 forms a sliding contact surface 13 via which a bearing ring or sliding ring of the shaft can be electrically contacted. Furthermore, circular contact element 11 is comparatively thin and is therefore also fastened on an also circular contact sheet 14 in a form-fit and electrically conductive manner. Spring means 12 forms a support section 15, a holding section 16 and a spring section 17. Holding section 16 forms a holding means 18 having a circular holding sheet 19 and contact sheet 14 formed thereon. Spring section 17 comprises three spring arms 20. Support section 15 is made of a radial circular washer 21 and an axial circular collar joined thereto, radial slits 23 which form spring claws 24 being formed in circular collar 22. Circular collar 22 serves for being radially abutted against an abutment surface (not illustrated) of the stator part. Furthermore, holding sheet 19, spring arms 20, circular washer 21 together with circular collar 22 are made in one piece by being punched from phosphorous bronze, brass or steel. In this context, spring section 17 connects holding sheet 19 to support section 15. Spring section 17 protrudes in particular beyond a support plane 26 of support section 15 and thus spaces holding means 18 from support section 15 in a radial direction with respect to a rotational axis 27 of the shaft (not illustrated).

Figure 2:
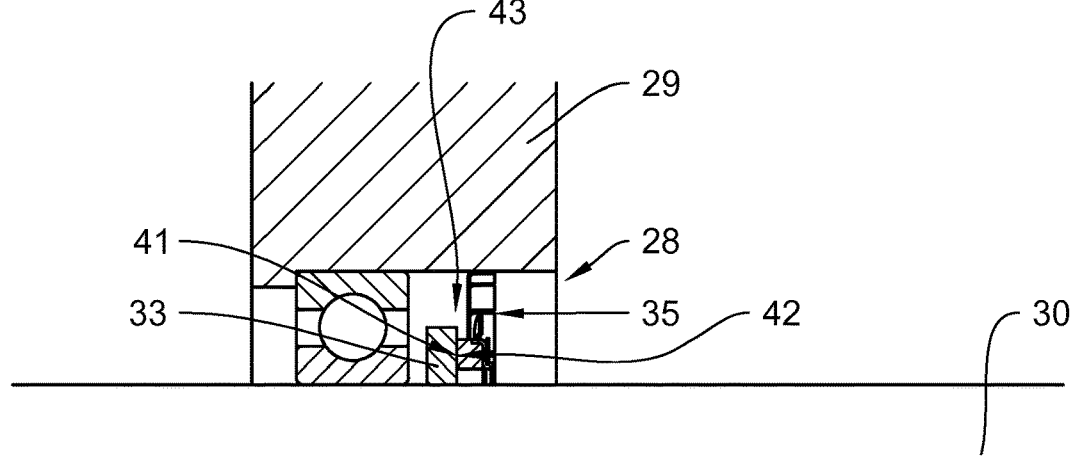
FIG. 2 is a sectional view of a discharge device in a casing of machine.
Figure 2:
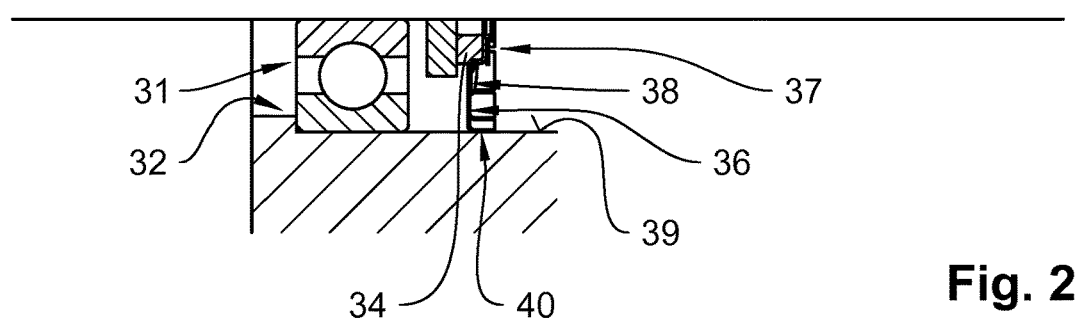

FIG. 2 shows a discharge device 28 when installed in a casing 29 (only partially illustrated) together with a shaft 30 of a machine (not illustrated). Shaft 30 is installed in a cylindric bore 32 of casing 29 in particular by means of a grooved ball bearing 31. On shaft 30, a sliding ring 33 of discharge device 28 is disposed in a fixed manner. Discharge device 28 further comprises a contact element 34 made of graphite and a spring means 35. Spring device 35 forms a support section 36, a holding section 37 and a spring section 38. Support section 36 is fastened to an abutment surface 39 of bore 32 via an axial circular collar 40. A diameter of circular collar 40 is sized such that support section 36 is clamped in bore 32 in a force-fit manner. Via spring section 38, a spring force can be applied to contact element 34 which abuts against a shaft contact surface 42 by a sliding contact surface 41. By means of this thus realized sliding contact 43, electric currents can be simply discharged to casing 29, and grooved ball bearing 31 can be protected from damage.

The invention claimed is:

1. A discharge device (10, 28) for discharging electric currents from a rotor part of a machine to a stator part of the machine, the rotor part having a shaft (30), the discharge device comprising a contact element (11, 34) and a spring (12, 35), the spring being connectable to the stator part in an electrically conductive manner, the contact element being made predominantly of carbon, the contact element being pressurized with a contact force by means of the spring for realizing an electrically conductive sliding contact (43) between a sliding contact surface (13, 41) of the contact element provided for realizing the sliding contact and an axial shaft contact surface (42) of the shaft, wherein the contact element is circular, the sliding contact surface being at least annular in shape and being disposed coaxially in relation to the shaft contact surface, the spring comprising a circular support section (15, 36) which coaxially encircles the shaft of the machine at least partially, the support section being configured for radially abutting against an abutment surface (39) of the stator part and the support section (15, 36) is realized by a radial circular washer (21) and an axial circular collar (22) adjacent thereto for abutting against the abutment surface (39).

2. The discharge device according to claim 1, wherein the shaft contact surface (42) is formed by a shaft ledge of the shaft (30) or a ring (33) of the discharge device (10, 28) disposed on the shaft.

3. The discharge device according to claim 1, wherein the contact element (11, 34) is made predominantly of graphite and is made in one piece.

4. The discharge device according to claim 1, wherein the spring (12, 35) has a holding section (16, 37) which forms a holder (18) for holding the contact element (11, 34), the spring comprising a spring section (17, 38) which extends from the holding section to the support section (15, 36) and enables moving the contact element in relation to the support section.

5. The discharge device according to claim 4, wherein the spring section (17, 38) protrudes from a support plane (26) of the support section (15, 36) and spaces the holder (18) from the support section.

6. The discharge device according to claim 4, wherein the spring section (17, 38) is made of at least one spring arm (20).

7. The discharge device according to claim 6, wherein the spring arm (20) extends from the holding section (16, 37) to the support section (15, 36) in a helical or spiraled shape.

8. The discharge device according to claim 6, wherein a length of the spring arm (20) is ½ of a winding, ⅓ of a winding, ¼ of a winding or 1/spring-arm number of a winding.

9. The discharge device according to claim 4,
wherein the contact element (11, 34) is fastened to the holder (18) in a form-fit and/or bonded manner.

10. The discharge device according to claim 4,
wherein the holder (18) forms a circular holding sheet (19) to which the contact element (11, 34) is fastened by riveting, welding, soldering, flanging or adhesion.

11. The discharge device according to claim 4,
wherein the holder (18) comprises a circular contact sheet (14) to which the contact element (11, 34) is fastened by riveting, welding, soldering, flanging or adhesion, the contact element being fastened to a circular holding sheet (19) of the holder (18) by riveting, welding, soldering, flanging or adhesion.

12. The discharge device according to claim 1, wherein the circular collar (22) is conical in shape.

13. The discharge device according to claim 1, wherein slits (23) are formed in the circular collar (22) which form spring claws (24) for being abutted against the abutment surface (39).

14. The discharge device according to claim 1, wherein the spring (12, 35) comprises an electrically conductive metal.

15. The discharge device according to claim 1, wherein the spring (12, 35) is made in one piece, by punching or bending.

16. The discharge device according to claim 1, wherein the spring (12, 35) has a coating made of copper, nickel, tin, zinc, gold or silver.

17. A machine having a shaft (30) forming the rotor part and a stator part, and a discharge device (10, 28) according to claim 1.

18. The machine according to claim 17, wherein
an abutment surface (39) is an inner surface of a casing (29) of the machine.

19. The machine according to claim 18, wherein a rolling bearing (31) of the shaft (30) abuts against the inner surface.

* * * * *